United States Patent [19]
Oshita et al.

[11] Patent Number: 5,526,861
[45] Date of Patent: Jun. 18, 1996

[54] INFLATION PRESSURE SENSOR FOR AUTOMOBILE PNEUMATIC TIRE

[75] Inventors: Saiichiro Oshita, Ohta; Hidehisa Tomizawa, Shimokobayashi; Kazutoshi Fukada; Yoshihiro Yoshida, both of Ohta, all of Japan

[73] Assignee: Fuji Jukogyo Kabushiki Kaisha, Tokyo, Japan

[21] Appl. No.: 353,199

[22] Filed: Dec. 9, 1994

[30]    Foreign Application Priority Data

Dec. 17, 1993 [JP]    Japan .................................. 5-318129

[51] Int. Cl.⁶ ............................................. B60C 23/04
[52] U.S. Cl. .................... 152/415; 73/146.5; 73/146.8; 340/442; 340/445
[58] Field of Search ........................... 152/415; 340/442, 340/444, 445; 73/146.5, 146.8, 146.2

[56]            References Cited

U.S. PATENT DOCUMENTS

| | | | |
|---|---|---|---|
| 3,715,719 | 2/1973 | Sugiyama | 340/445 |
| 3,872,268 | 3/1975 | Hata | 340/445 X |
| 4,157,530 | 6/1979 | Merz | 340/445 |
| 4,208,649 | 6/1980 | Sarides | 340/448 |
| 4,348,896 | 9/1982 | Sarides | 340/442 X |
| 4,807,468 | 2/1989 | Galan | 340/448 X |

FOREIGN PATENT DOCUMENTS

2-31281    3/1986    Japan .
5-139128   6/1993    Japan .

Primary Examiner—Michael W. Ball
Assistant Examiner—Francis J. Lorin
Attorney, Agent, or Firm—Martin A. Farber

[57]            ABSTRACT

A tire inflation pressure sensor mounted on the outside of the wheel. The sensor housing includes a diaphragm, a cylinder, a magnet holder, a spring, a magnet holding member connected with a magnet, a guide member and a stopper. When the inflation pressure of a tire is normal, the magnet holding member stops at a position where the magnet indicates a north pole. When the inflation pressure goes down below a specified value, the magnet holding member travels a predetermined distance and at the same time the magnet holding member rotates at a predetermined angle indicating a south pole. This changeover of magnetic polarity is detected by an external magnetic induction element to operate a warning device.

10 Claims, 6 Drawing Sheets

PRIOR ART

INFLATION PRESSURE SENSOR FOR AUTOMOBILE PNEUMATIC TIRE

BACKGROUND OF THE INVENTION

1. Technical Field

The present invention relates to an inflation pressure sensor for automobile tire and more specifically relates to a wheel mounted inflation pressure sensor for automobile pneumatic tire.

2. Related Prior Art

There have been proposed several techniques for monitoring the inflation pressure of a tire and among them most popular technique comprises an inflation pressure sensor mounted on the wheel rim, a magnet induction switch mounted on a stationary member such as a back plate of a brake adjacent to the inflation pressure sensor, and a warning device for warning to a vehicle driver with a warning lamp or buzzer responding to the operation of the magnetic induction switch.

Figure 8:
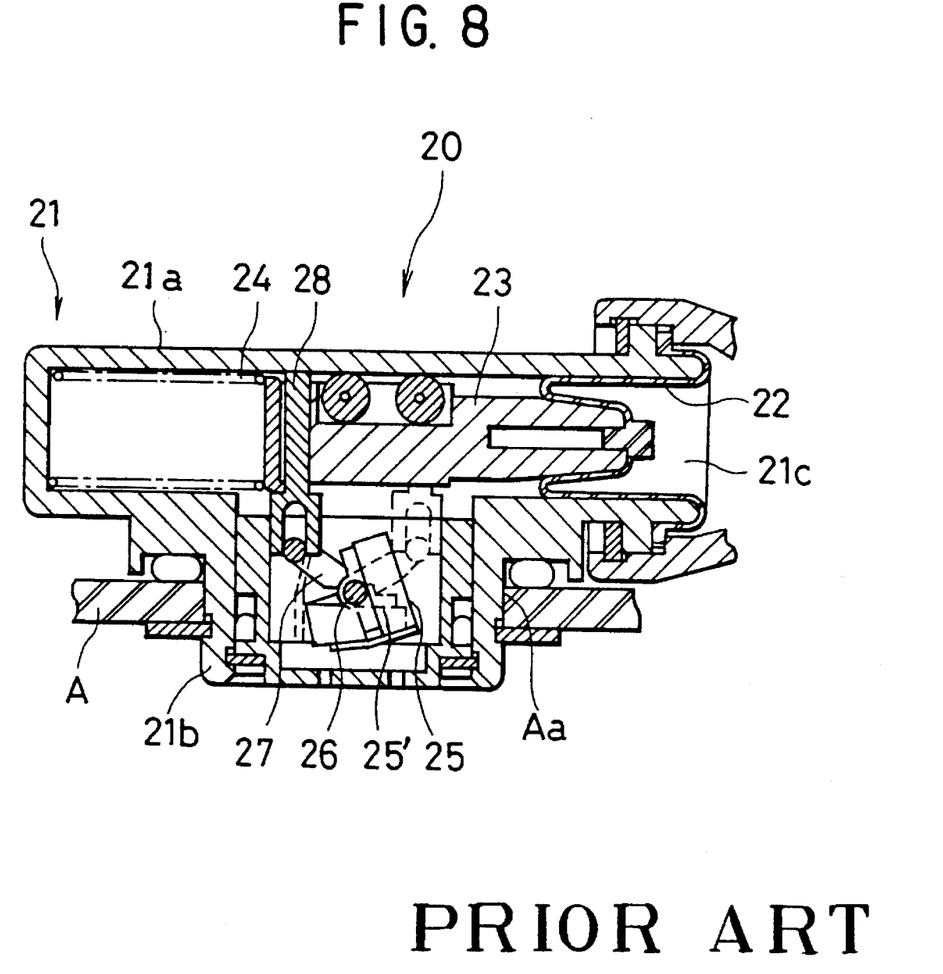
FIG. 8 is a view showing an inflation pressure sensor according to a prior art.

With respect to the inflation pressure sensor, for example, Japanese Utility Model Application, Jitsu-Kou-Hei No. 2-31281 discloses an air pressure sensor 20 as shown in FIG. 8 which comprises a sensor casing 21 composed of a cylindrical housing 21a disposed in parallel with the rotational axis of the wheel and a mounting boss 21b orthogonally projected from the cylindrical housing 21a, an opening open to the interior of a tire at one end of the cylindrical housing 21a, a diaphragm 22 composed of an elastic material such as silicon rubber and fixed to the open end of the cylindrical housing 21a, guide member a 23 fixed to the diaphragm 22 which moves backward and forward in the cylindrical housing 21a, a spring 24 provided in the cylindrical housing 21a for pushing the guide member 23 forward against the tire inflation pressure applied to the diaphragm 22, a permanent magnet 25 rotatably connected to an axis 26 in the mounting boss 21b of the sensor casing 21, a swing arm 27 fixed to the axis 26, a connecting member 28 for connecting the guide member 23 and the swing arm 27 and transmitting the movement of the guide member 23 to the permanent magnet 25 fixed on a holding member.

The inflation pressure sensor 20 thus constituted is mounted on a rim A through a mounting hole Aa with the head of the boss housing 21b projected out of the rim A and disposed adjacent to the magnetic induction switch (not shown).

When the inflation pressure is high, the inflation pressure pushes the diaphragm 22 into the sensor casing 21 against the spring force. In this state, since the magnet 25 is held at the position facing laterally as shown in FIG. 8, the magnetic induction switch is not subjected to lines of magnetic force, therefore it is never be induced.

On the other hand, when the inflation pressure is below a specified value, the spring force of the spring 24 becomes stronger than the inflation pressure and the guide member 23 moves towards the opening portion 21c in the cylindrical housing 21a. As a result, the magnet 25 is rotated around the axis 26 and held in the position facing downward as shown by the two-dot chain line in FIG. 8. In this state, each time when the inflation pressure sensor 20 comes close to the magnetic induction switch, lines of magnetic force induce the magnetic induction switch to operate the warning device for warning a vehicle driver.

According to the inflation pressure sensor above mentioned, the sensor casing comprises a cylindrical housing and a mounting boss. In the cylindrical housing a diaphragm fixed to a guide member is provided at one end of the cylindrical housing and a spring is built in at the other end. Further, in the boss housing, a magnet, a magnet holder, an axis, a swing arm and a connecting member are mechanically linked with each other.

However, as mentioned above, the inflation pressure sensor according to this prior art has so many pieces of components that there are problems such as a complicated construction, an upsizing, a weight increase and a cost increase, Especially, the weight increase incurs an increased correction amount of the wheel balance. Further, since the inflation pressure sensor according to this prior art has a big projection into the interior of tire, it has a fear that the sensor itself may be damaged by getting jammed between the tire and the wheel when the inflation pressure goes down suddenly in such a case as a puncture of tire.

Further, since this type of inflation pressure sensor is formed such that the magnitude of the magnet is detected by a magnetic induction switch when the magnet comes close to the magnetic induction switch, the magnitude of the magnet varies according to an accuracy at installing the sensor, temperature change or the like and therefore there is a possibility that a lowering of inflation pressure is not detected or erroneously detected.

SUMMARY OF THE INVENTION

It is an object of the present invention to provide an inflation pressure sensor for automobile pneumatic tire having a simple structure, a light weight and a Low manufacturing cost.

It is another object of the invention to provide an inflation pressure sensor having a very small projection into the interior of tire and thereby capable of being prevented from the damage at the puncture of tire.

It is further object of the invention to provide an inflation pressure sensor capable of detecting a lowering of inflation pressure sensor accurately without effects of an installation accuracy and temperature change.

Disclosed is an inflation pressure sensor comprising:

a housing mounted on the outside of a wheel rim and communicated to the inside of the wheel rim through an air passage;

a cylinder provided in the housing with an orthogonal axis to a perpendicular Line of a rotational axis of the wheel;

a magnet holder for transmitting a movement thereof in response to said inflation pressure;

a spring for biasing the magnet holder;

a diaphragm provided in the housing and communicated to the inside of the wheel rim through the air passage for transmitting the inflation pressure to the magnet holder;

a magnet provided in the magnet holder; and magnet rotating means in response to the movement of the magnet holder for rotating the magnet around a guide rod and for changing a polarity of the magnet at a specific portion of the housing, In the inflation pressure sensor thus constituted, when the inflation pressure is normal, the polarity of the magnet indicates a north pole. However, when the inflation pressure goes down below a specified value, the spring force of the spring overcomes the inflation pressure and move the magnet holder towards the diaphragm. Then the magnet holding member is moved along the guide rod being pushed by the magnet holder. Since the guide rod has a spiral groove, the magnet holding member is rotated around the guide rod and accordingly the magnet connected to the magnet holding member is rotated from the position of the north pole to the position of the south pole. Thus, an external magnetic induction switch detects this changeover of magnetic polarity and generates a warning signal indicating a lowering of inflation pressure to a warning device.

DETAILED DESCRIPTION OF PREFERRED EMBODIMENTS

Figure 1:
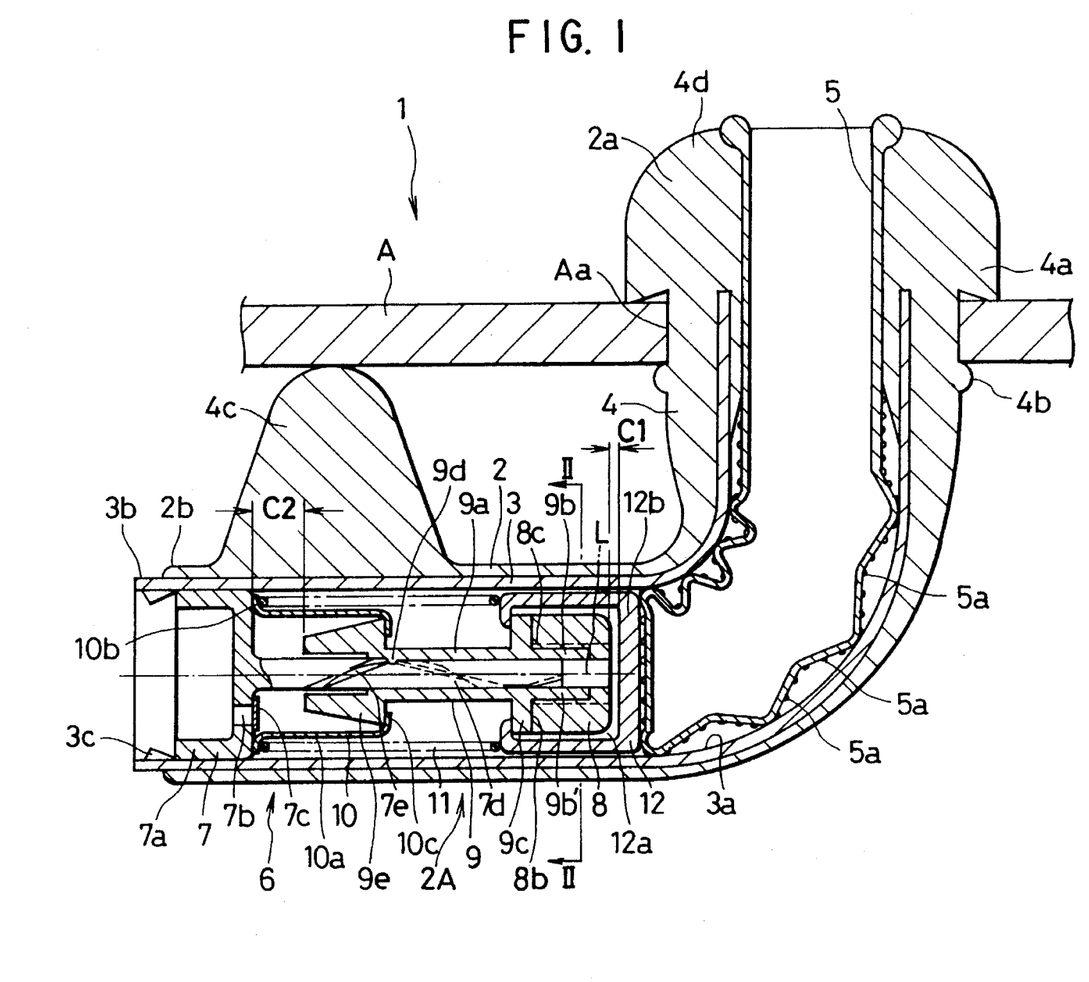
FIG. 1 is a view showing an inflation pressure sensor according to the present invention.
Figure 3:
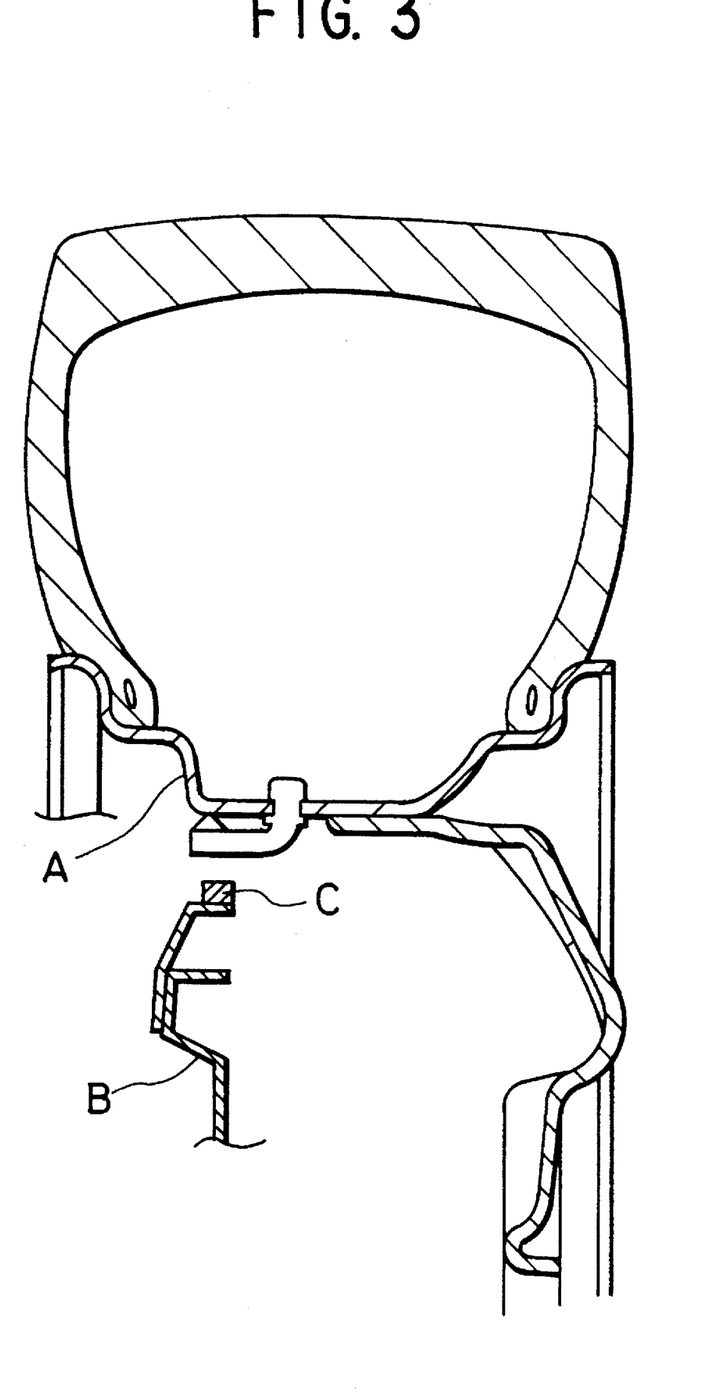
FIG. 3 is a view showing state of the inflation pressure sensor mounted on the wheel with tire.

Referring to FIG. 1, numeral 1 is an inflation pressure sensor according to an embodiment of the present invention. As shown in FIG. 3, the inflation pressure sensor 1 is fixed on a rim A of the wheel such that it has a face-to face access to a magnetic induction element C mounted on a stationary member such as a back plate B of a brake each time the wheel turns once.

The inflation pressure sensor 1 has a sensor housing 2 whose one end portion 2a is fixed in a mounting hole Aa on the rim A and open to the interior of the tire and whose other end portion 2b is open to the outside air.

The sensor housing 2 has a two layers construction composed of a cylindrical sensor pipe 3 made of non-magnetic metal, such as aluminum, bronze and the like, or made of plastic and a rubber coat 4 covering the sensor pipe 3. The end portion 2a secures its position by a mounting flange 4a and a mounting flange 4b for elastically sealing periphery edges of the mounting hole Aa on the rim A. The sensor housing 2 is extruded out of the mounting hole Aa at the outside of the rim A and therefrom extended in "L" shape in the parallel direction with the wheel axis. In the extended portion of the sensor housing 2 there contains an operational element housing 2A and a stopper boss 4c is attached on the rubber coat 4 near the other end portion 2b of the sensor housing 2 for preventing the extended portion of the sensor housing 2 from shaking due to the centrifugal force caused by the rotation of the wheel.

A diaphragm 5 which is made of the same material with the rubber coat 4 or silicon rubber is fixed to the inner surface of the rubber coat 4 by bonding or curing at the end portion 2a of the sensor housing 2. The diaphragm 5 expands or contracts along an inner surface 3a of the sensor pipe 3. On the outer surface of the diaphragm 5 there are provided lots of small embosses 5a in order to avoid adhesion to the inner surface 3a of the sensor pipe 3 and a magnet holder 12 and to reduce the sliding resistance when the diaphragm 5 expands or contracts. The small embosses around the outer periphery of the diaphragm 5 may be replaced with a plurality of ring shaped embosses (not shown).

A preassembled rotating mechanism 6 which comprises a guide member 7, a magnet holding member 9 equipped with a permanent magnet 8, a spring guide 10, a spring 11 and a magnet holder 12 is press-fitted into the operational element housing 2A. The guide member 7 comprises a disc shaped base plate 7a and a guide rod 7d coaxially extending from the base plate 7a. There is provided a communicating hole 7b for communicating between inside and outside of the sensor case 2 on the base plate 7a. The communicating hole 7b is plugged with a plug member 7c made of a material such as porous filter which permits to pass air but not to pass water in order to prevent mud and dust splashed by tires from coming into the sensor housing. Further, a spiral groove 7e is formed at the outer periphery of the guide rod 7d. According to the embodiment of the present invention, the groove 7e is formed such that the magnet holding member 9 is rotated by just 180 degrees while the magnet holding member 9 travels a movable range, as will be described hereinafter.

Figure 2:
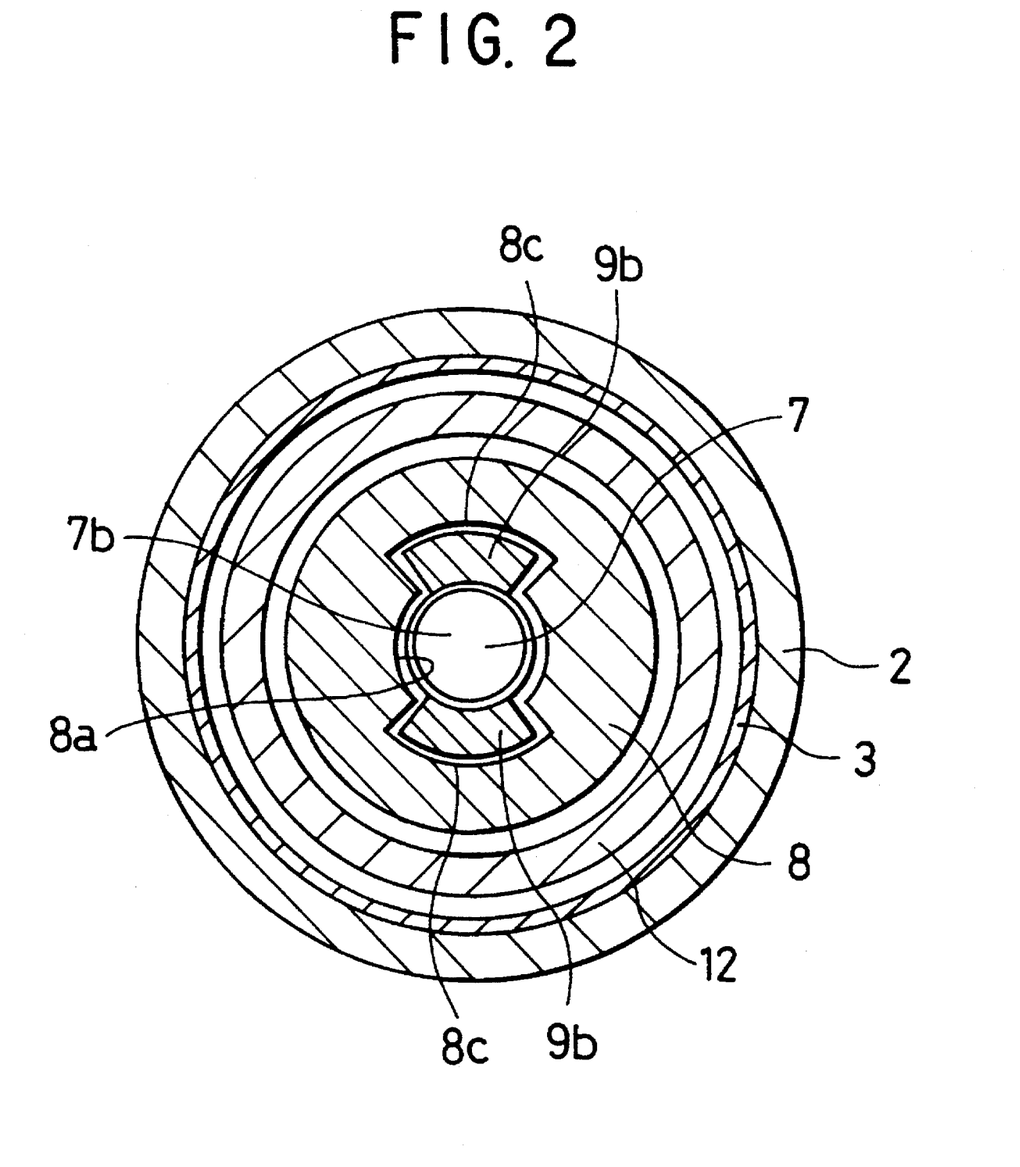
FIG. 2 is a II—II sectional view of FIG. 1.

The magnet 8 is shaped in a cylinder like and has north and south poles symmetrically about the axis line L. Further, the magnet holding member 9 holding the magnet 8 is also shaped in a cylinder like with a through hole therein allowing to insert the guide rod 7d of the guide member 7. On the inner surface 9a of the magnet holding member 9 there is provided a projection 9d slidably to be fitted in the groove 7e formed on the guide rod 7d. Further, at the end of the magnet holding member 9 two projections 9b to be loosely inserted into a slot 8c formed on the inner periphery surface 8a of the magnet 8 are provided. Since the slot 8c has a shape as shown in FIG. 2, the rotational movement of the magnet holding member 9 is transmitted to the magnet 8 through the projections 9b. Further, at the root of the projection 9b there is provided a disk-shaped flange 9c for restricting the relative position of the magnet 8. Further, at the other end of the guide member 7 a head section 9e having truncated cone shape is formed.

Figure 4:
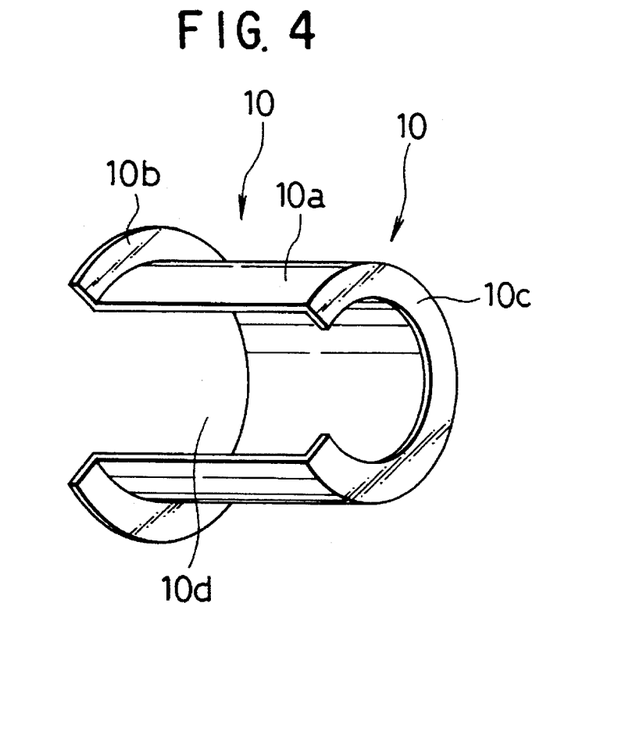
FIG. 4 is a view showing a spring guide used in the inflation pressure sensor according to the present invention.

Referring to FIG. 4, the spring guide 10 has a cutout section 10d open to one side and a straight spring guide section 10a whose vertical section is shaped in "C". At the end of the spring guide 10 there is provided a spring retaining section 10b and at the other end of the spring guide 10 a stopper section 10c is provided. Further, the spring guide section 10a is provided between the spring retaining section 10b and a stopper section 10c.

Figure 5:
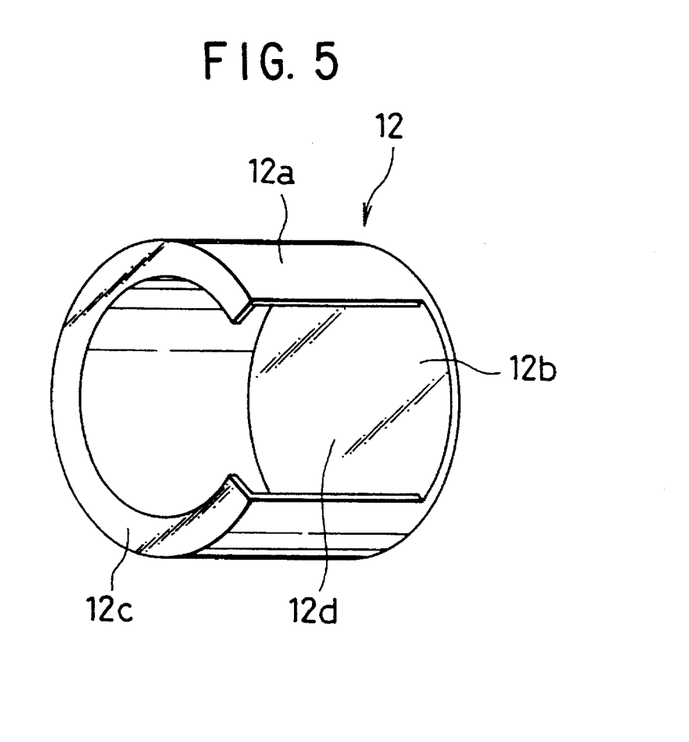
FIG. 5 is a view showing a magnet holder used in the inflation pressure sensor according to the present invention

Referring to FIG. 5, the magnet holder 12 has a cutout section 12d open to one side and a straight cylindrical section 12a whose vertical section is shaped in "C". At the end of the magnet holder 12 there is provided a bottom section 12b for closing the end thereof and at the other end a stopper section 12c is provided. Further, the cylindrical section 12a is provided between the stopper section 12c and the bottom section 12b. The cylindrical section 12a is formed such that the flange 9c and the magnet 8 can be accommodated therein with appropriate clearances.

To assemble these members of thus constituted rotating mechanism 6, first the magnet 8 is inserted into the magnet holding member 9 and the communicating hole 7b of the guide member 7 is plugged with the plug member 7c. Next, the guide member 7 is inserted into the magnet holding member 9 from the head section 9e side such that the project,on 9d of the magnet holding member 9 rides in the groove 7e formed on the guide rod 7d of the guide member 7. Next, the head section 9e of the magnet holding member 9 is put into the spring guide 10 through the cutout section 10d thereof. Next, the spring 11 is inserted into the spring guide 10 from the magnet 8 side and then the flange 9c with the magnet 8 is put into the magnet holder 12 through the cutout section 12d of the magnet holder 12 while the spring 11 is compressed. When the spring 11 is released in this state, the head section 9e of the magnet holding member 9 touches the stopper section 10c by the force of the spring 11 with a clearance $C_2$ and at the same time the flange 9c of the magnet holding member 9 touches the stopper section 12c of the magnet holder 12 with a clearance $C_1$.

The rotating mechanism 6 is also able to be assembled as follows:

First, the magnet holding member 9 which has been equipped with the magnet 8 is put into the spring guide 10 through the cutout section 10d. Next the spring 11 is inserted into the spring guide 10 from the magnet 8 side and then the magnet holding member 9 is put into the magnet holder 12 through the cutout section 12d of the magnet holder 12 while the spring 11 is compressed. Finally the guide member 7 is inserted into the magnet holding member 9 while the projection 9d of the magnet holding member 9 is fitted in the groove 7e on the guide rod 7d of the guide member 7.

The rotating mechanism 6 thus assembled is press-fitted into the sensor pipe 3 from the open end 3b of the sensor pipe 3 up to a predetermined depth after the positioning of the magnet 8, namely, adjusting the position of the magnet 8 so as to face for example the south magnetic pole of the magnet 8 to the magnetic induction element C is performed. At this positioning of the magnet 8, it is not necessary to pay so much attention to an accuracy of positioning. Because what the magnet induction element C detects is a change of the magnetic polarity (for example, a north pole to a south pole), therefore the initial position of the magnet pole does not matter so much. After fitting, the rotating mechanism 6 is fixed in the operational element housing 2A by a caulking 3c. Thus, the inflation pressure sensor 1 is completed.

In the inflation pressure sensor 1 thus assembled, when the tire is pressurized from zero to a normal value (for example 2.0 kg/cm2), the diaphragm 5 pushes the magnet holder 12 against the spring force of the spring 11 in the direction of the open end 3b of the sensor case 2. First, the magnet holder 12 hits the magnet 8 after traveling as much as the clearance $C_1$ between the inner surface of the magnet holder 12 and the magnet 8. After that, the magnet holder 12 pushes the magnet 8 and the magnet 8 pushes the flange 9c, namely the magnet holding member 9. The clearance $C_1$ is provided for giving a smooth rotation to the magnet holding member 9. In this embodiment, when the tire is pressurized at a normal value, the magnet holding member 9 is formed such that the head section 9e travels as much as the clearance $C_2$ between the head section 9e and the inner surface of the guide member 7 and then hits the inner surface of the guide member 7. Even when the tire is pressurized more than the normal value, the magnet holding member 9 does not travel more than this. During the traveling of the magnet holding member 9 accompanied by this pressurization, the projection id travels along the groove 7e of the guide member 7 by just the same distance as the magnet holding member 9 and at the same time the projection 9d, namely the whole rotating mechanism 6 rotates along the groove 7e around the guide rod 7d just by 180 degrees. That its to say, the polarity of the magnet is changed from the south pole to the north pole.

In this condition, when the magnet induction element C comes close to the inflation pressure sensor 1 with the rotation of the wheel, since the magnet induction element C does not detect a change of polarity, no warning is raised.

On the other hand, when the inflation pressure is lower than a predetermined value (for example 1.7 kg/cm2) as shown in FIG. 1, the diaphragm 5 is contracted and as a result the spring force of the spring 11 forces the magnet holder 12 to move in the direction of the end portion 2a of the sensor housing 2. According to the movement of the magnet holder 12, the stopper section 12c pushes the flange 9c of the magnet holding member 9 to move the magnet holding member 9 in the direction of the end portion 2a of the sensor housing 2. Finally when the inflation pressure becomes below the predetermined value such as indicating a lowering of inflation pressure, the magnet holding member 9 hits the stopper section 10c of the spring guide 10 and is stopped there. That is to say, the magnet holding member has traveled just a distance of the clearance $C_2$. Being accompanied with this traveling of the magnet holding member 9, the magnet holding member 9 itself is forced to be rotated by the projection 9d of the magnet holding member 9 moving along the groove 7e, whereby the magnet 8 is rotated just by 180 degrees and the polarity of the magnet is changed from the north pole to the south pole.

When the polarity of the magnet is changed, the magnetic induction element C detects a change of direction of induction current and produces an operation signal each time when the inflation pressure sensor 1 comes close to the magnetic induction element C. According to the operation signal from the magnetic induction element C, the warning device (not shown) gives a vehicle driver a warning.

Thus, since the inflation pressure sensor 1 according to the present invention is formed such that the change of only magnetic polarity is detected, the change of tire inflation pressure can be detected accurately regardless of the installation accuracy of the inflation pressure sensor 1 and the magnet induction element C or the change of magnetic field caused by temperature change.

Figure 6:
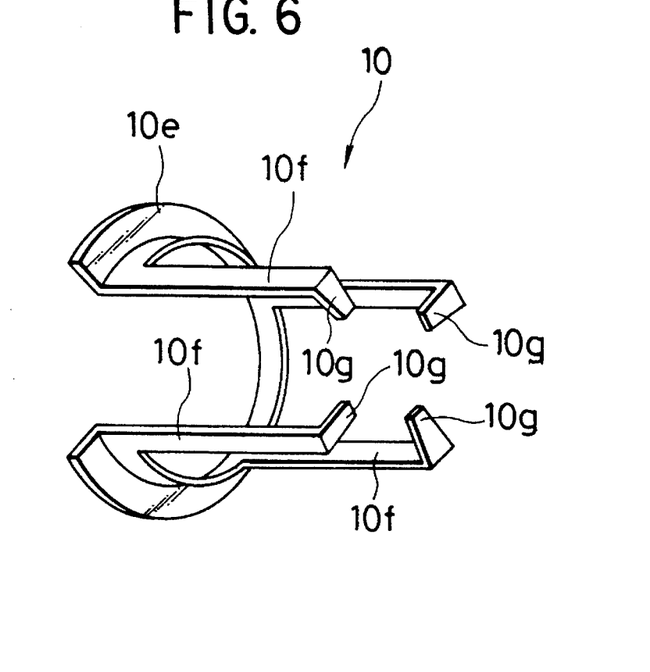
FIG. 6 is a view showing another embodiment of a spring guide.
Figure 7:
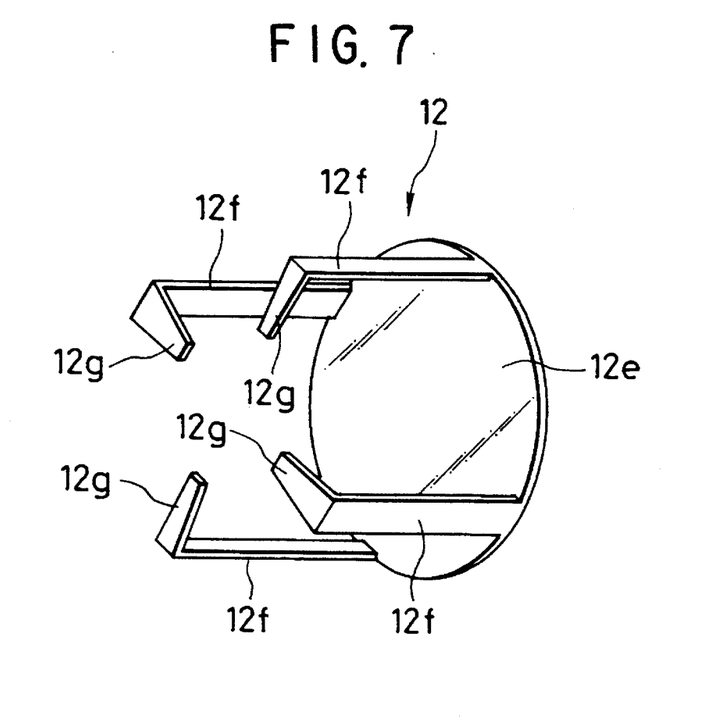
FIG. 7 is a view showing another embodiment of a magnet holder.

Referring to FIG. 6 and FIG. 7, these drawings show another embodiment of the spring guide 10 and the magnet holder 12 respectively.

Another embodiment of the spring guide 10 as shown in a perspective view of FIG. 6 comprises a spring retaining section 10e, a plurality of spring guide sections 10f standing on the spring retaining section 10e at appropriate spaces, and a stopper section log formed by orthogonally bending the tip portion of each spring guide section 10f.

Further, another embodiment of the magnet holder 12 as shown a perspective view of FIG. 7 comprises a disc-shaped bottom section 12e, a plurality of holding sections 12f standing on the bottom section 12e at appropriate spaces, and a stopper section 12g formed by orthogonally bending the tip portion of each holding section 12f.

In the embodiment above described, there are several variations (not shown) which will be described hereinafter.

The magnet 8 may be connected tightly to the magnet holding member 9 by bonding or press-fits.

Further, in the embodiment described before the assembled rotating mechanism 6 is press-fitted in the sensor pipe 3 such that the north magnetic pole faces to the magnetic induction element C, however in this case the south magnetic pole may face to the magnetic induction element C.

Further, the spiral groove 7e may be provided on the inner surface 9a of the magnet holding member 9 and the projection 9d may be provided on the guide member 7.

Further, in place of the spiral groove 7e a thread having a large lead angle may be cut on the guide rod 7d of the guide member 7 or the inner surface 9a of the magnet holding member 9.

In summary, according to thus constituted inflation pressure sensor for tire, the lowering of inflation pressure is detected by means of rotating the rotating mechanism for reversing the polarity of the magnet built in the inflation pressure sensor. Since the rotational angle of the rotating mechanism corresponds exactly to the traveling distance of the rotational mechanism which is determined according to inflation pressure, the reversing of the polarity at the lowering of inflation pressure can be detected without being affected by an installation accuracy of the inflation pressure sensor. Furthermore, since the sensor housing is disposed such that the traveling direction of the rotating mechanism therein is parallel with the rotational axis of the wheel, an effect of centrifugal force can be minimized. Further, since the inflation pressure sensor according to the present invention has fewer components and more simplified mechanism than the prior art, low manufacturing cost and spared working time for engagement can be provided. Further, since the inflation pressure sensor has a very small projection or emboss in the inner side of the rim, the sensor can be avoided to be damaged when the tire is punctured.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A tire inflation pressure sensor mounted on a rim of a wheel for detecting a lowering of an inflation pressure by using a magnet, comprising:

a housing mounted on the outside of said rim and communicated to the inside of said rim;

a cylinder provided in said housing;

a piston for transmitting a movement thereof in response to said inflation pressure;

a magnet provided in said piston; and magnet rotating means in response to said movement of said piston for rotating said magnet and for changing a polarity of said magnet only at a specific portion of said housing.

2. The tire inflation pressure sensor according to claim i, further comprising:

a diaphragm provided in said housing for transmitting said inflation pressure to said piston.

3. The tire inflation pressure sensor according to claim 1, further comprising:

a spring provided in said housing for biasing said piston.

4. The tire inflation pressure sensor according to claim 1, wherein said cylinder has an orthogonal axis to a perpendicular line of a rotational axis of said wheel.

5. The tire inflation pressure sensor according to claim 1, wherein said magnet rotating means comprises a magnet holding member having a spiral groove therein, said magnet connected to said magnet holding member, a guide rod fixed to said housing having a projection thereon;

said guide rod is fitted in said magnet holding member by putting said projection in said spiral groove;

said piston rotatably holds therein said magnet and moves said magnet holding member through said magnet thereof in response to said movement of said piston;

said magnet holding member is rotated around said guide rod by spirally sliding said magnet holding member on said guide rod when said magnet holding member is moved along said cylinder;

said magnet rotating means has a first stopper for prohibiting said magnet holding member to move further, when said inflation pressure reaches a normal value or more;

said magnet rotating member has a second stopper for prohibiting said magnet holding member to move further, when said inflation pressure reaches a specific value indicating said lowering of said inflation pressure or less;

said polarity of said magnet at said specific portion of said housing indicates a north (south) pole when said magnet holding member is stopped by said first stopper; and said polarity of said magnet at said specific portion of said housing indicates a south (north) pole when said magnet holding member is stopped by said second stopper.

6. The tire inflation pressure sensor according to claim 1, wherein said housing is made of elastic material and has a stopper boss for preventing a vibration of said tire inflation pressure sensor and a mounting flange for mounting said tire inflation pressure sensor on said rim.

7. The tire inflation pressure sensor according to claim 2, wherein said diaphragm has a plurality of embosses on a surface thereof.

8. The tire inflation pressure sensor according to claim 5, wherein said magnet rotating means comprises a magnet holding member having a projection therein, a guide rod fixed to said housing having a spiral groove thereon; and said guide rod is fitted in said magnet holding member by putting said projection in said spiral groove.

9. The tire inflation pressure sensor according to claim 5, wherein said magnet rotating means comprises a magnet holding member having an internal thread therein, a guide rod fixed to said housing having an external thread thereon; and said guide rod is fitted in said magnet holding member by putting said external thread in said internal member by putting said external thread.

10. A tire inflation pressure sensor mounted on a rim of a wheel for detecting whether an inflation pressure is lowered or not by using a magnet, comprising:

a housing mounted on the outside of said rim and communicated to the inside of said rim;

a cylinder provided in said housing;

a piston for transmitting a movement thereof in response to said inflation pressure;

a magnet provided in said piston; and magnet rotating means in response to said movement of said piston for rotating said magnet and for changing a polarity of said magnet only at a specific portion of said housing.

* * * * *